(12) United States Patent
Kawaguchi

(10) Patent No.: US 11,452,170 B2
(45) Date of Patent: *Sep. 20, 2022

(54) COMMUNICATION SYSTEM, INFORMATION PROCESSING APPARATUS, AND COMMUNICATION METHOD

(71) Applicant: Ricoh Company, Ltd, Tokyo (JP)

(72) Inventor: Takuji Kawaguchi, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/821,089

(22) Filed: Mar. 17, 2020

(65) Prior Publication Data
US 2020/0221535 A1 Jul. 9, 2020

Related U.S. Application Data

(63) Continuation of application No. 15/592,606, filed on May 11, 2017, now Pat. No. 10,674,561.

(30) Foreign Application Priority Data

May 17, 2016 (JP) ................................. 2016-098788
Mar. 30, 2017 (JP) ................................. 2017-067473

(51) Int. Cl.
*H04W 76/38* (2018.01)
*H04W 76/14* (2018.01)

(52) U.S. Cl.
CPC ........... *H04W 76/38* (2018.02); *H04W 76/14* (2018.02)

(58) Field of Classification Search
None
See application file for complete search history.

(56) References Cited

U.S. PATENT DOCUMENTS

2013/0260682 A1* 10/2013 Suzuki .................. H04W 76/15
                                                                455/41.1
2014/0112326 A1    4/2014 Torikai et al.
(Continued)

FOREIGN PATENT DOCUMENTS

JP    2004-328289 A    11/2004
JP    2013-214802 A    10/2013
(Continued)

OTHER PUBLICATIONS

Office Action dated Oct. 13, 2020 in corresponding Japanese Patent Application No. 2017-067473, 4 pages.

*Primary Examiner* — Ajit Patel
*Assistant Examiner* — Pamit Kaur
(74) *Attorney, Agent, or Firm* — Xsensus LLP

(57) ABSTRACT

A communication system includes a terminal apparatus, and an information processing apparatus. The terminal apparatus includes first circuitry to perform a direct connection with the information processing apparatus wirelessly, transmit an information processing request, requesting processing of information, to the information processing apparatus, and transmit a disconnection request of the direct connection to the information processing apparatus after transmitting the information processing request to the information processing apparatus. The information processing apparatus includes second circuitry to perform the direct connection with the first circuitry of the terminal apparatus wirelessly, process the information processing request received from the terminal apparatus, and disconnect the direct connection of the information processing apparatus and the terminal apparatus in response to receiving the disconnection request.

10 Claims, 12 Drawing Sheets

(56) References Cited

U.S. PATENT DOCUMENTS

| | | | |
|---|---|---|---|
| 2014/0118769 A1 | 5/2014 | Adachi | |
| 2014/0195705 A1* | 7/2014 | Lee | H04W 88/00 |
| | | | 710/106 |
| 2014/0320909 A1 | 10/2014 | Shimazaki | |
| 2014/0362841 A1* | 12/2014 | Shibata | H04W 48/18 |
| | | | 370/338 |
| 2015/0193183 A1* | 7/2015 | Ichikawa | H04N 1/00307 |
| | | | 358/1.15 |
| 2016/0042257 A1* | 2/2016 | Kim | G06F 3/1292 |
| | | | 358/1.15 |
| 2016/0192429 A1* | 6/2016 | Nogawa | H04W 76/19 |
| | | | 370/329 |
| 2016/0261975 A1* | 9/2016 | Kurihara | H02J 50/80 |

FOREIGN PATENT DOCUMENTS

| | | |
|---|---|---|
| JP | 2014-86844 A | 5/2014 |
| JP | 2014-158163 | 8/2014 |
| JP | 2015-106798 A | 6/2015 |
| JP | 2015-130637 A | 7/2015 |
| JP | 2017-065199 | 4/2017 |

\* cited by examiner

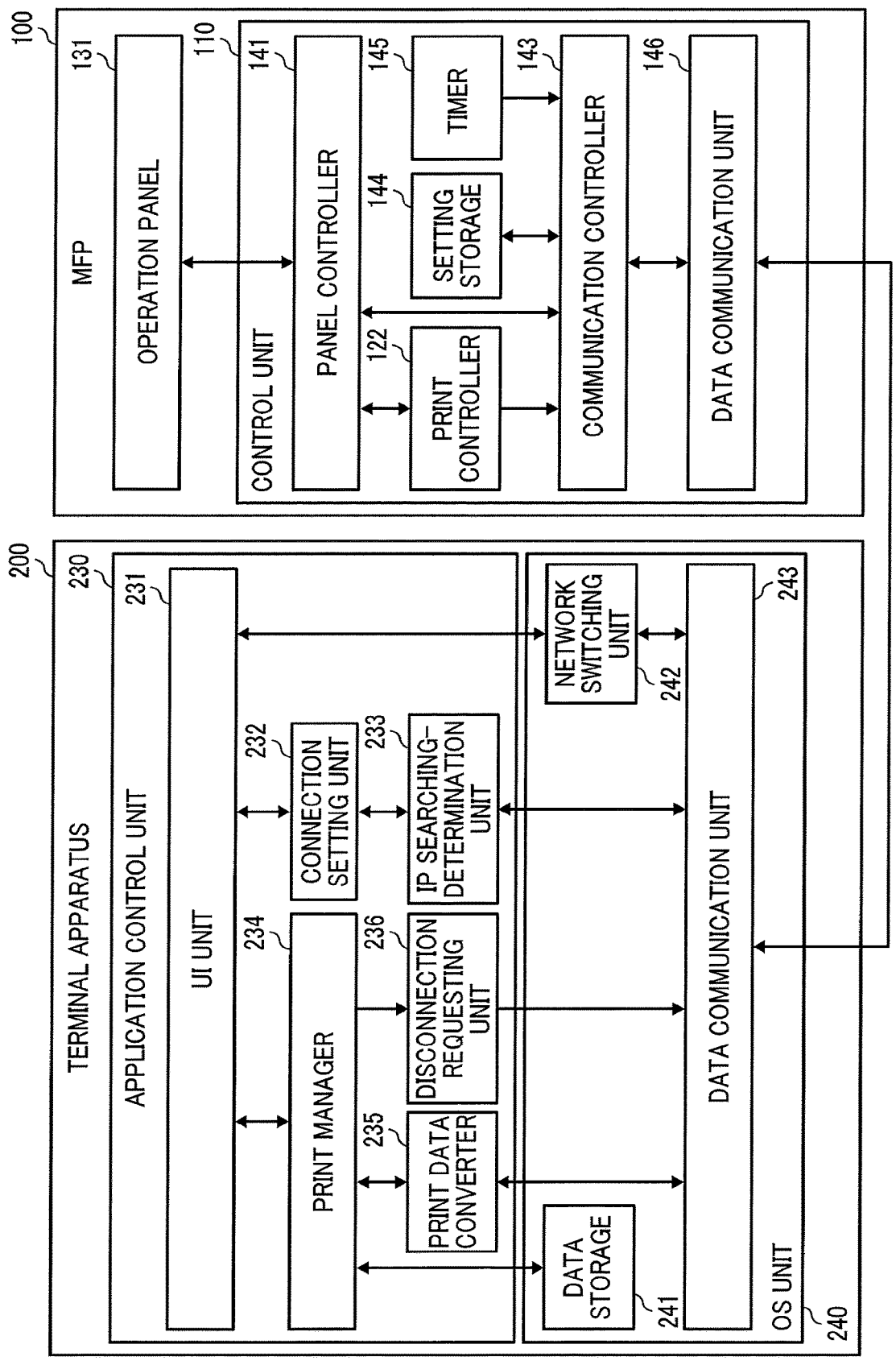

<MAIN MENU SETTING

☐ PRINT SETTING
☐ CONNECTION APPARATUS SWITCHING — 411
☐ QR CODE SETTING
⋮

400

<SETTING   Wi-Fi

Wi-Fi                         ON

SELECT NETWORK

MFP-Direct        📶ⓘ
⋯⋯⋯⋯             📶ⓘ
⋯⋯⋯⋯             📶ⓘ

400

CANCEL  INPUT PASSWORD  CONNECT

PASSWORD  ○○○○○○○○

400

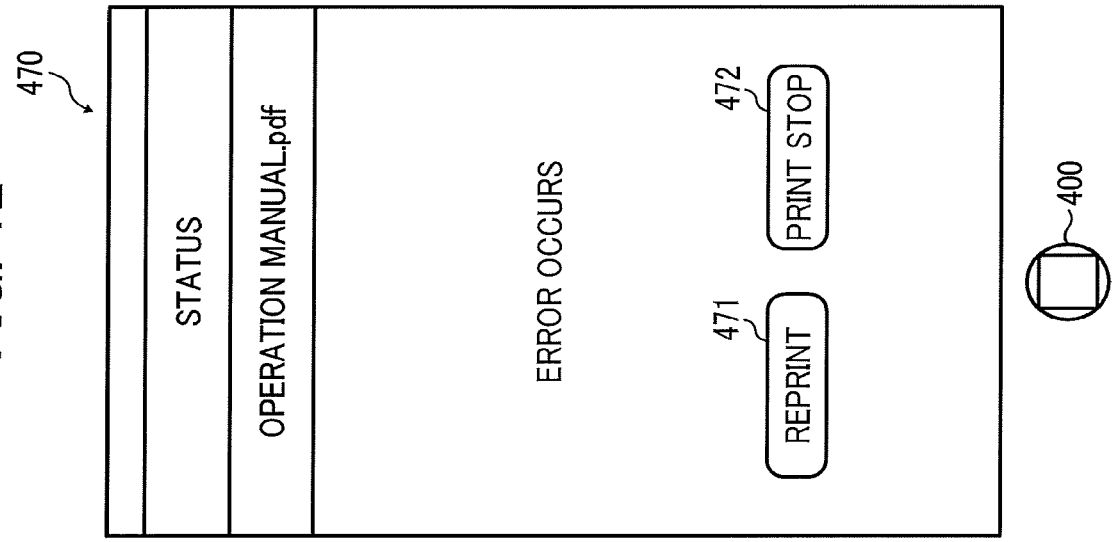
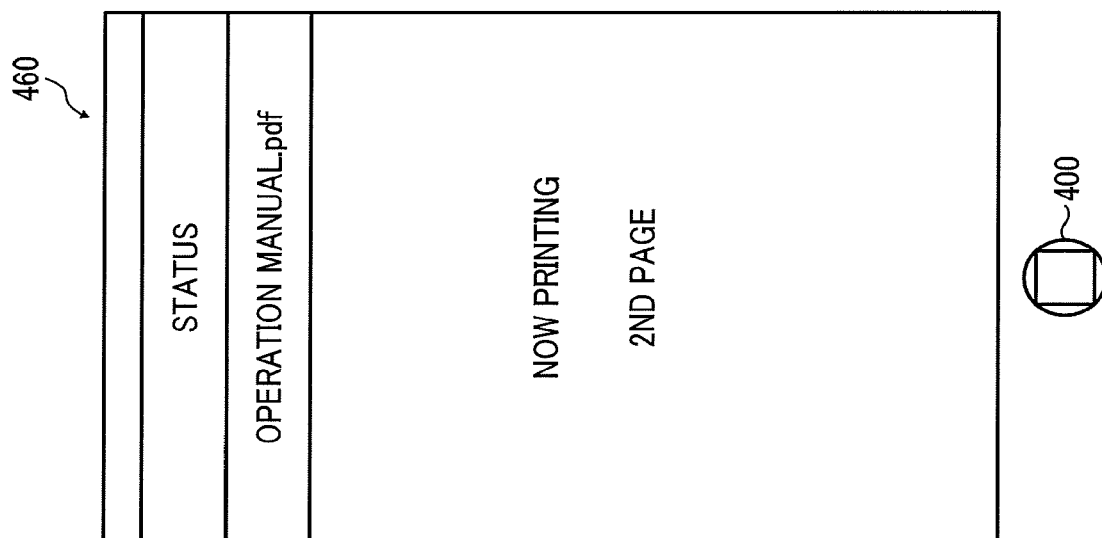

COMMUNICATION SYSTEM, INFORMATION PROCESSING APPARATUS, AND COMMUNICATION METHOD

CROSS-REFERENCE TO RELATED APPLICATION

This application is a continuation of and claims the benefit of priority under 35 U.S.C. § 120 from U.S. application Ser. No. 15/592,606 filed May 11, 2017, and claims the benefit of priority under 35 U.S.C. § 119 from Japanese Patent Application No. 2016-098788 filed May 17, 2016 and No. 2017-067473 filed Mar. 30, 2017, the entire contents of each of which are incorporated herein by reference.

BACKGROUND

Technical Field

This disclosure relates to a communication system, program, information processing apparatus, and communication method.

Background Art

Lately, terminal apparatuses such as smart phones and tablet personal computers (PC), and information processing apparatuses such as printers and digital cameras can be directly connected with each other by using Wi-Fi Direct, which means a direct connection (i.e., pier to pier connection) can be established between the terminal apparatus and the information processing apparatus. When the terminal apparatus and the information processing apparatus are connected with each other by the direct connection, images stored in the terminal apparatus can be easily printed by the printer, and data stored in the digital camera can be easily transferred to the terminal apparatus. JP-2014-158163-A discloses a communication apparatus that uses a Wi-Fi Direct network for a communication service.

Typically, under a standard communication environment, the terminal apparatus is connected to an external network such as Wi-Fi, and telephone line such as 3G/LTE, and a direct connection is performed temporarily only when the direct connection is required. Therefore, when the terminal apparatus is connected to the information processing apparatus by the direct connection, and the terminal apparatus completes the transmission of required information, it is preferable that the terminal apparatus returns to the standard communication environment. However, some OS of terminal apparatuses (e.g., iOS) do not allow an application of the terminal apparatuses to change a connection partner such as a network because the OS exclusively manages the connection partner on the network. In this configuration, the application cannot disconnect and end the direct connection, and thereby a user is required to input an instruction for changing the connection partner from a management screen of OS, which becomes a complex operation for the user.

SUMMARY

As one aspect of present disclosure, a communication system is devised. The communication system includes a terminal apparatus, and an information processing apparatus. The terminal apparatus includes first circuitry to perform a direct connection with the information processing apparatus wirelessly, transmit an information processing request, requesting processing of information, to the information processing apparatus, and transmit a disconnection request of the direct connection to the information processing apparatus after transmitting the information processing request to the information processing apparatus. The information processing apparatus includes second circuitry to perform the direct connection with the first circuitry of the terminal apparatus wirelessly, process the information processing request received from the terminal apparatus, and disconnect the direct connection of the information processing apparatus and the terminal apparatus in response to receiving the disconnection request.

As another aspect of present disclosure, an information processing apparatus is devised. The information processing apparatus includes circuitry to connect directly with a terminal apparatus wirelessly, process a target operation corresponding to an information processing request received from the terminal apparatus, count time after completing the processing of the target operation corresponding to the information processing request, and disconnect the direct connection with the terminal apparatus when the circuitry receives a disconnection request of the direct connection from the terminal apparatus or when the circuitry counts a given time period.

As another aspect of present disclosure, a method of communication for a terminal apparatus and an information processing apparatus is devised. The method includes directly connecting the terminal apparatus and the information processing apparatus wirelessly, transmitting an information processing request from the terminal apparatus to the information processing apparatus directly connected with the terminal apparatus, processing a target operation corresponding to the information processing request, received from the terminal apparatus, at the information processing apparatus, transmitting a disconnection request of the direct connection from the terminal apparatus to the information processing apparatus after transmitting the information processing request to the information processing apparatus, and disconnecting the direct connection of the terminal apparatus and the information processing apparatus when the information processing apparatus receives the disconnection request of the direct connection from the terminal apparatus.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 4 is an example of a functional block diagram of a terminal apparatus and an information processing apparatus of an embodiment of the present invention;

FIG. 11 illustrates an example of a print status screen displayable at step S123; and FIG. 12 illustrates an example of a print status screen displayable at step S135.

Figure 1:
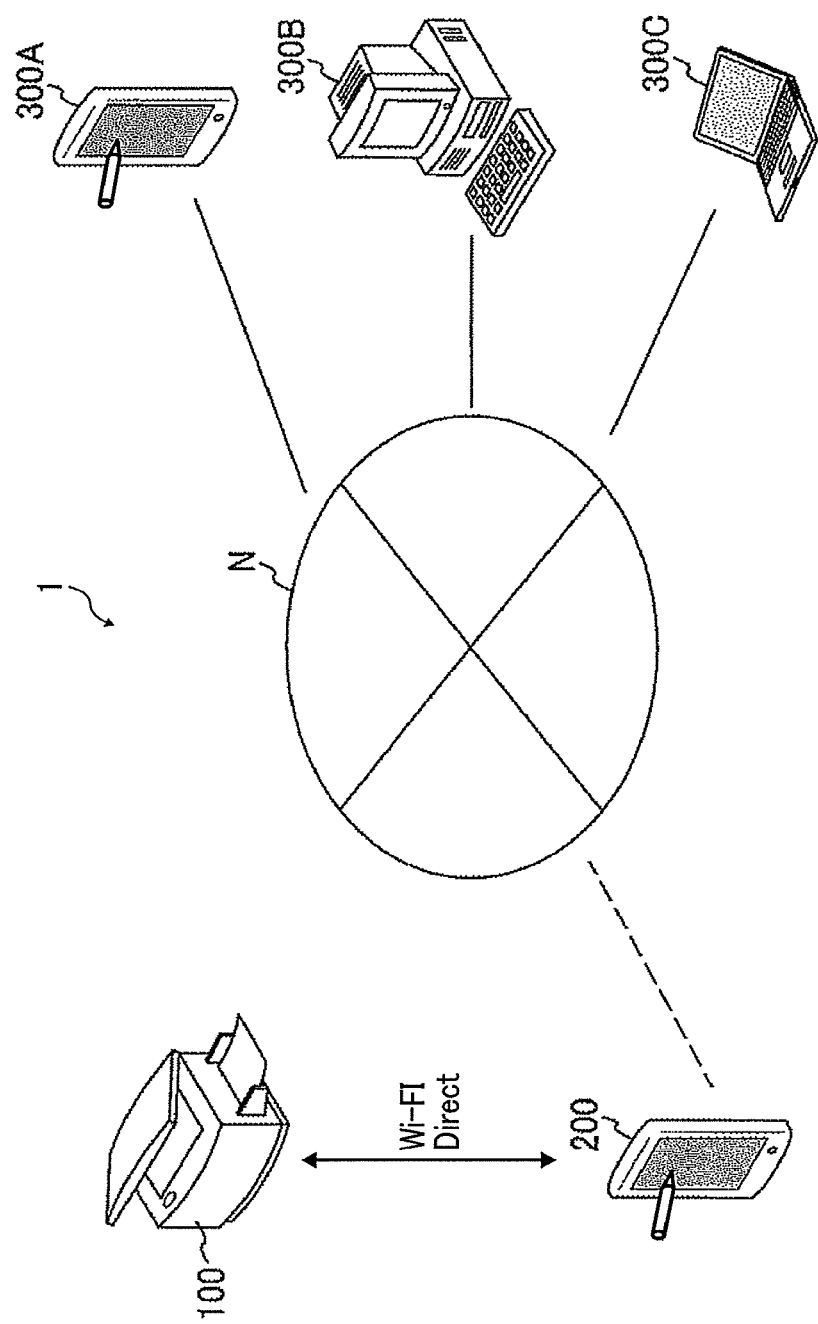
FIG. 1 is a schematic overall configuration of a communication system of an embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

As to embodiments to be described in this disclosure, when a terminal apparatus transmits an instruction of disconnection of a direct connection with an information processing apparatus, or when the information processing apparatus determines to disconnect a direct connection with the terminal apparatus, the information processing apparatus disconnects the direct connection with the terminal apparatus. With this processing configuration, the terminal apparatus leaves from the direct connection with the information processing apparatus. Typically, the terminal apparatus can be connected to a network used as a standard connection partner of the terminal apparatus. When the terminal apparatus is to be directly connected to the information processing apparatus, the terminal apparatus is disconnected from the network, and then the terminal apparatus is directly connected to the information processing apparatus. Then, when the terminal apparatus leaves from the direct connection with the information processing apparatus, OS of the terminal apparatus searches a network that can be connected to the terminal apparatus, and performs a re-connection processing (i.e., network reconnection capability of OS) such that the terminal apparatus can be returned to the network used as the standard connection partner.

(Configuration of Communication System)

FIG. 1 is a schematic configuration of a communication system 1 of an embodiment of the present invention. As illustrated in FIG. 1, the communication system 1 includes, for example, a multi-function peripheral (MFP) 100 that is an example of information processing apparatuses, and a terminal apparatus 200 that is an example of terminal apparatuses.

The MFP 100 can be used as an access point known as a group owner of Wi-Fi Direct (registered trademark) standard defined by Wi-Fi Alliance. The terminal apparatus 200 can be directly connected to the MFP 100 by using Wi-Fi Direct, and the terminal apparatus 200 can be used as a client. The MFP 100 is, for example, a digital multi-functional apparatus (i.e., image forming apparatus) having various capabilities such as a printer, a scanner, and a facsimile, and the MFP 100 can be used as an access point complied with IEEE (The Institute of Electrical and Electronics Engineers) 802.11 standard series. When the MFP 100 is directly connected with the terminal apparatus 200, the MFP 100 can provide various information processing capabilities based on a request from the terminal apparatus 200. For example, the MFP 100 can provide information processing capabilities such as a capability of printing an image received from the terminal apparatus 200. The information processing capabilities of the MFP 100 may be also referred to as a service provider in this description.

The terminal apparatus 200 can be used as a station or client complied with a standard such as IEEE802.11 standard series. Further, the terminal apparatus 200 can be connected with other terminal apparatus 300 (e.g., terminal apparatuses 300A, 300B, 300C) such as a smart phone, a tablet personal computer (PC), a desk top PC, and a note PC via a network N that is not using the Wi-Fi Direct. The information processing apparatus such as the MFP 100, and the terminal apparatus such as the terminal apparatus 200 and the terminal apparatus 300 can be collectively referred to as an communication apparatus configured by known hardware configuration.

The network N can be, for example, a local area network (LAN), a wide area network (WAN), and the Internet. The terminal apparatus 200 can be connected to the network N via an access point such as a Wi-fi router. Further, in the embodiments of this disclosure, the information processing apparatus such as the MFP 100 can be used as the group owner, but not limited thereto. For example, the group owner can be any apparatuses such as a digital camera instead of the MFP 100. Further, the group owner can be any apparatuses connected to the network N or connectable to the network N, or any apparatus not connected to the network N or unconnectable to the network N such as stand-alone apparatus. In this description, the plurality of apparatuses can be connected wirelessly or by wire.

(Hardware Configuration of MFP)

Figure 2:
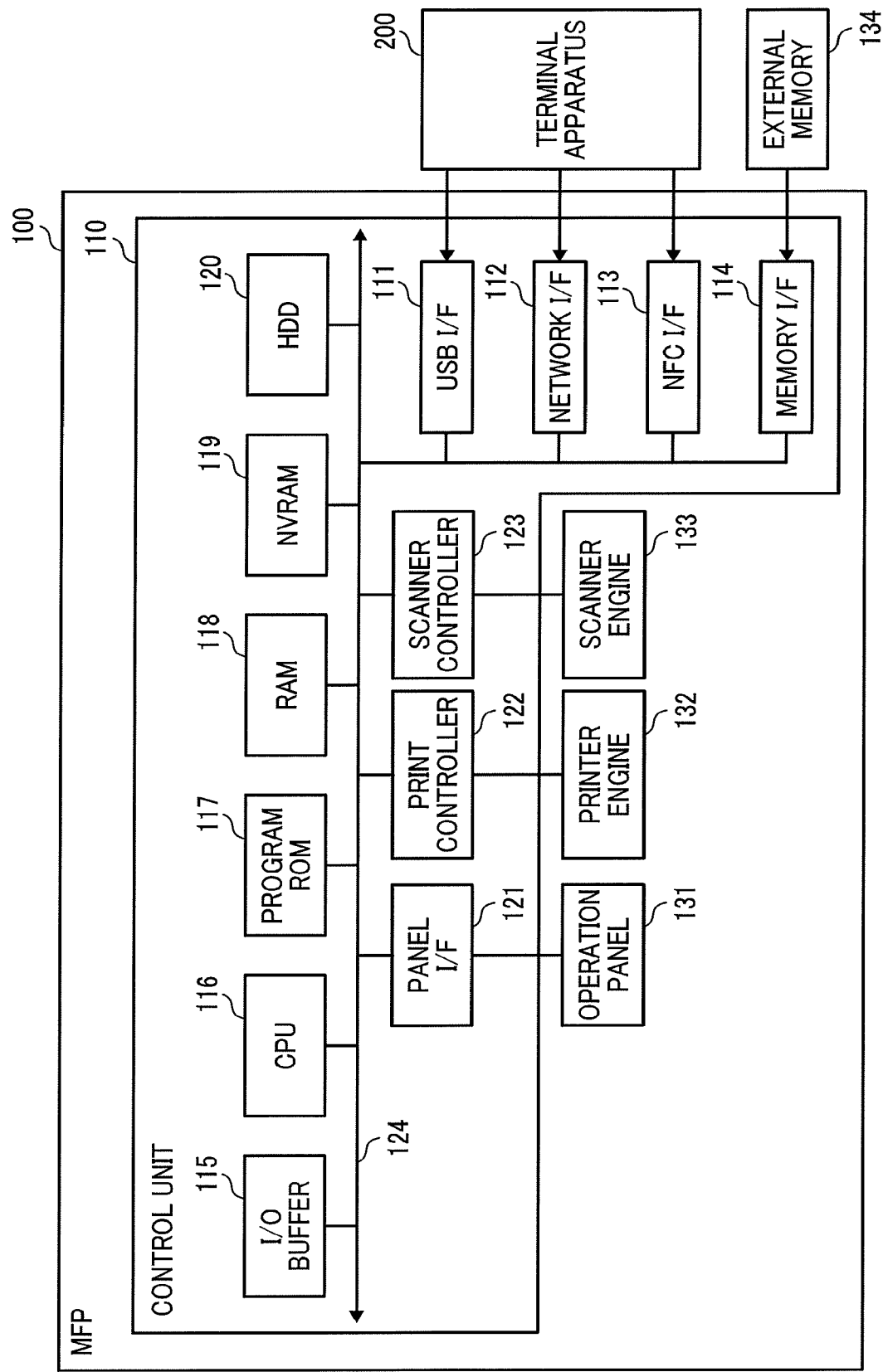
FIG. 2 is an example of a hardware block diagram of an information processing apparatus of an embodiment of the present invention.

FIG. 2 is an example of a hardware block diagram of the MFP 100 of an embodiment of the present invention. As illustrated in FIG. 2, the MFP 100 includes, for example, a control unit 110, an operation panel 131, a printer engine 132, and a scanner engine 133. The control unit 110 controls the MFP 100 entirely. The operation panel 131 receives a user's operation to the MFP 100. The printer engine 132 prints image data. The scanner engine 133 scans document image and outputs image data of the scanned document image.

The control unit 110 includes, for example, an external interface (I/F) unit including a universal serial bus (USB) I/F 111, a network I/F 112, a near field radio communication (NFC) I/F 113, a memory I/F 114, an input-output (I/O) buffer 115, a central processing unit (CPU) 116, a program read only memory (program ROM) 117, a random access memory (RAM) 118, a non-volatile random access memory (NVRAM) 119, a hard disk drive (HDD) 120, a panel I/F 121, a print controller 122, and a scanner controller 123, which are connected with each other via a system bus 124 to communicate data.

The external I/F unit such as the USB I/F 111, network I/F 112, and NFC I/F 113 respectively uses a universal serial bus (USB), a network communication, and a near field radio communication (NFC) as a communication medium. The external I/F unit such as the USB I/F 111, network I/F 112, NFC I/F 113 is used to communicate data with other apparatuses such as the terminal apparatus 200 and the terminal apparatus 300. For example, the network I/F 112 communicates with a client using wireless LAN communication complied with the IEEE 802.11 standard. The memory I/F 114 detects a connection with an external memory 134 such as a removable medium (e.g., SD card), and is used to communicate data between the external memory 134 and the control unit 110. The external memory 134 is used as a memory to store print data, data for setting apparatus information of the MFP 100, update-use data, various data of the MFP 100, and data input from an external apparatus.

The input-output (I/O) buffer 115 is used to communicate various information such as print control codes and various data input from other apparatuses, control codes for communication medium, and various data of the MFP 100. The CPU 116 controls the MFP 100 entirely such as processing of various data. The program ROM 117 stores programs used for controlling the operation of the CPU 116, and programs used for managing and controlling data of each module. The programs stored in the program ROM 117 can be loaded on the RAM 118 and executed by the CPU 116. The RAM 118 is used as a working area of the CPU 116, a buffer to manage and store image data page by page, and a bit map memory to store print data converted from data in the buffer. The NVRAM 119 is a memory to store data even if a power supply to the MFP 100 is turned OFF. The HDD 120 is a memory to store large capacity data such as image data.

The panel I/F 121 is used to communicate data between the control unit 110 and the operation panel 131. The print controller 122 controls the printer engine 132. The print controller 122 controls the printer engine 132 that executes a printing operation, and is used to communicate data between the control unit 110 and the printer engine 132. The scanner controller 123 controls the scanner engine 133. The scanner controller 123 controls the scanner engine 133 that executes a scanning operation of document image, and is used to communicate data between the control unit 110 and the scanner engine 133.

(Hardware Configuration of Terminal Apparatus)

Figure 3:
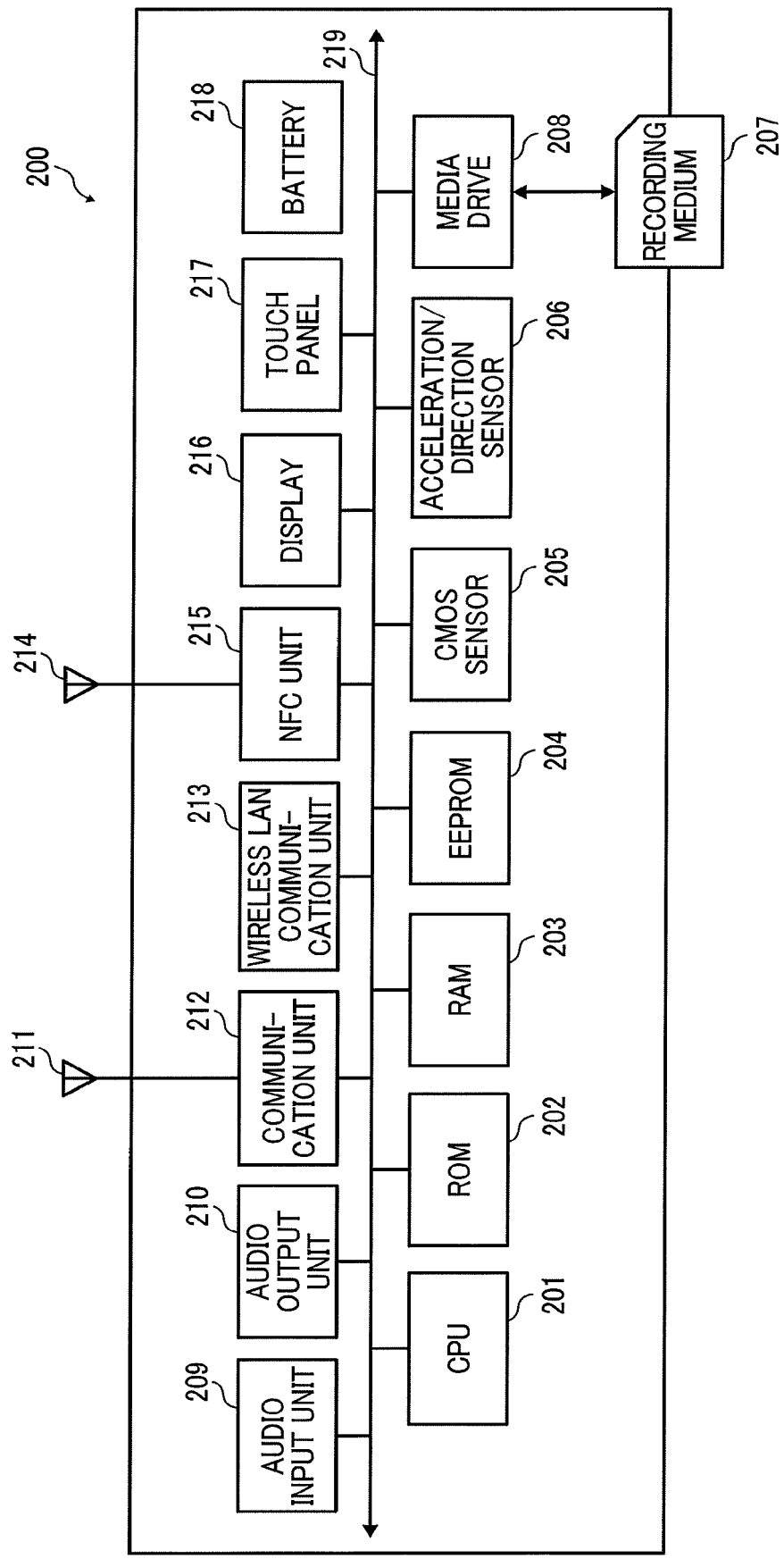
FIG. 3 is an example of a hardware block diagram of a terminal apparatus of an embodiment of the present invention.

FIG. 3 is an example of a hardware block diagram of the terminal apparatus 200 of an embodiment of the present invention. As illustrated in FIG. 3, the terminal apparatus 200 includes, for example, a CPU 201, a ROM 202, a RAM 203, an electrically erasable programmable read only memory (EEPROM) 204, a complementary metal oxide semiconductor (CMOS) sensor 205, an acceleration/direction sensor 206, and a media drive 208. The CPU 201 controls the operation of the terminal apparatus 200 entirely. The ROM 202 stores a basic input/output program. The RAM 203 is used as a working area of the CPU 201. The EEPROM 204 reads and writes data under the control of the CPU 201. The CMOS sensor 205 captures an image of an object to acquire image data under the control of the CPU 201. The acceleration/direction sensor 206 includes, for example, an electromagnetic compass that detects geomagnetism, a gyrocompass, and an accelerometer. The media drive 208 controls data reading and writing (storing) to a recording medium 207 such as a flash memory. The recording medium 207 is detachable to the media drive 208. The media drive 208 reads data stored in the recording medium 207 from the recording medium 207, and the media drive 208 writes new data to the recording medium 207 to store the new data in the recording medium 207. The EEPROM 204 stores an operating system (OS) that the CPU 201 executes, and association information required for a network setting. Applications used for performing various processing to implement the embodiment of the present invention can be stored in the EEPROM 204 and/or the recording medium 207.

Further, the CMOS sensor 205 is an example of charge coupled element that converts light to charges to digitize a captured object image. The CMOS sensor 205 can be any charge coupled device (CCD) sensor that can capture an image of an object. The terminal apparatus 200 further includes, for example, an audio input unit 209, an audio output unit 210, an antenna 211, a communication unit 212, a wireless LAN communication unit 213, a near field radio communication (NFC) antenna 214, a near field radio communication (NFC) unit 215, a display 216, a touch panel 217, and a bus line 219.

The audio input unit 209 converts audio sound to audio signals. The audio output unit 210 converts the audio signals to the audio sound. The communication unit 212 communicates with a nearest base station using wireless communication signals via the antenna 211. The wireless LAN communication unit 213 performs wireless LAN communication with an access point complied with IEEE 802.11 standard. The NFC unit 215 performs a near field radio communication such as Bluetooth (registered trademark) communication via the NFC antenna 214. The display 216 employs, for example, a liquid crystal panel, and an organic electroluminescence (OEL) display that displays an image of an object and various icons. The touch panel 217 employs, for example, a pressure sensitive panel or an electrostatic panel that is placed on the display 216. When a finger or a touch pen touches the touch panel 217, a touch point on the display 216 is detected. The bus line 219 includes, an address bus to electrically connect the above units, and a data bus.

Further, the terminal apparatus 200 may include, for example, a battery 218. The terminal apparatus 200 can be driven by the battery 218. The audio input unit 209 includes, for example, a microphone that inputs audio sound. The audio output unit 210 includes, for example, a speaker that outputs audio sound. The terminal apparatus 200 of the embodiment can perform to-be-described various processing by using the above described hardware configuration.

(Functional Block Diagram of MFP and Terminal Apparatus)

FIG. 4 is an example of a functional block diagram of the terminal apparatus 200 and the MFP 100 of an embodiment of the present invention. As illustrated in FIG. 4, the terminal apparatus 200 includes, for example, an application control unit 230 and an OS unit 240. The application control unit 230 is implemented by executing an application program installed to the terminal apparatus 200. The OS unit 240 is implemented by executing an operating system (OS) installed to the terminal apparatus 200. Hereinafter, the application control unit 230 is described, for example, as a print application, but the application control unit 230 can used for other applications. Further, each of the units configuring the application control unit 230 can be implemented by executing a plurality of application programs.

The application control unit 230 includes, for example, a user interface (UI) unit 231 (useable as a disconnection condition setting unit), a connection setting unit 232, an internet protocol (IP) searching-determination unit 233, a print manager 234 (useable as processing requesting unit, disconnection condition setting unit), a print data converter 235, and a disconnection requesting unit 236 (useable as disconnection requesting unit).

The OS unit 240 includes, for example, a data storage 241, a network switching unit 242 (useable as first connection unit), and a data communication unit 243. The UI unit 231 of the application control unit 230 is used as an interface that a user interacts information with the application program. When the user inputs a setting and an instruction or command to the terminal apparatus 200 from the UI unit 231. Each of the units of the application program is operated based on the input setting and instruction. The data communication unit 243 of the OS unit 240 is used for communicating data (i.e., transmission and reception of data) with the MFP 100, other information processing apparatus, and other terminal apparatus.

A description is given of a processing for performing a network connection. The connection setting unit 232 of the application control unit 230 sets an information processing apparatus that is to provide specific information processing capabilities to the terminal apparatus 200 based on an instruction input by a user via the UI unit 231, in which the information processing apparatus is used as a service provider that provides the specific information processing capabilities to the terminal apparatus 200. The information processing apparatus set by the connection setting unit 232 can be any information processing apparatuses that can be communicably connected with the terminal apparatus 200 by using any types of connection modes. Specifically, the connection setting unit 232 designates the MFP 100 (i.e., information processing apparatus) to be directly connected with the terminal apparatus 200 by Wi-Fi Direct, or an information processing apparatus to be connected with the terminal apparatus 200 via the network N as illustrated in FIG. 1.

When the user selects an information processing apparatus disposed on the network N (FIG. 1) currently connected with the terminal apparatus 200 as the information processing apparatus to be used as the service provider, the connection setting unit 232 instructs the IP searching-determination unit 233 to execute a connection process with the designated information processing apparatus.

By contrast, when the user designates an information processing apparatus disposed on another network different from the network N currently connected with the terminal apparatus 200 as the information processing apparatus to be used as the service provider, the connection setting unit 232 calls the network switching unit 242 of the OS unit 240 to execute another processing. In this case, the information processing apparatus disposed on another network different from the network N means the information processing apparatus disposed on another network that cannot be connected with the terminal apparatus 200 from an access point currently connected with the terminal apparatus 200, or the information processing apparatus that is required to be connected with the terminal apparatus 200 by using Wi-Fi Direct.

The IP searching-determination unit 233 determines whether an IP address of the selected information processing apparatus, designated by the connection setting unit 232, is valid. The IP address of the information processing apparatus can be input by the user via the UI unit 231 when the user designates the information processing apparatus, or the IP address of the information processing apparatus can be input by the user via the UI unit 231 in advance and stored in a specific area allocated in the EEPROM 204 (FIG. 3). When the IP searching-determination unit 233 determines that the IP address of the information processing apparatus is valid, the IP searching-determination unit 233 sets the valid IP address as a connection partner such as a connection network or apparatus of the terminal apparatus 200.

The network switching unit 242 of the OS unit 240 performs or executes switching of a network to be connected with the terminal apparatus 200, in which a connection partner of the terminal apparatus 200 is changed from one connection apparatus or network to another connection apparatus or network. Specifically, for example, in one case, the network switching unit 242 disconnects the terminal apparatus 200 from the network N (FIG. 1), and then connects the terminal apparatus 200 to another network via another access point, and in another case, the network switching unit 242 disconnects the terminal apparatus 200 from the network N (FIG. 1), and then connects the terminal apparatus 200 to an information processing apparatus such as MFP 100 by using Wi-Fi Direct (FIG. 1).

Further, when the terminal apparatus 200 is disconnected from Wi-Fi Direct or the network that was connected with the terminal apparatus 200, the network switching unit 242 searches a new connection partner and performs or executes another connection processing.

In this configuration, the network switching unit 242 can be called from the connection setting unit 232 as above described, or the network switching unit 242 can be called by a user from the UI unit 231 directly without using the connection setting unit 232 by inputting an instruction to a setting screen of OS, and then the network switching unit 242 switches the connection partner such as apparatus and network to be connected with the terminal apparatus 200.

A description is given of processing for performing or executing a printing operation. In this description, the printing operation is described as an example of target operations performed for the communication system 1. When a user designates print data (e.g., document, bit map image) via the UI unit 231, and inputs a printing operation instruction via the UI unit 231, the print manager 234 of the application control unit 230 acquires the designated print data.

Further, the print manager 234 outputs the acquired print data to the print data converter 235, and instructs the print data converter 235 to transmit a print job (i.e., information processing request) to the MFP 100 to request the MFP 100 to perform a printing operation of the print data. For example, the print manager 234 can acquire the print data from the network N. In this description, the print job is described as an example of the information processing request. After the print manager 234 outputs the print data to the print data converter 235, the print manager 234 calls the disconnection requesting unit 236.

The print data converter 235 converts the print data acquired from the print manager 234 to a printable data format such as page-description language (PDL) as the print job, and transmits the print job to the MFP 100 via the data communication unit 243.

After the print manager 234 calls the disconnection requesting unit 236, the disconnection requesting unit 236 transmits a disconnection request of Wi-Fi Direct to the MFP 100 via the data communication unit 243 as required. The data storage 241 of the OS unit 240 stores the print data.

The above described functional units that are provided by the application control unit 230 and the OS unit 240 can be implemented by reading programs stored in the ROM 202 by the CPU 201, and loading the programs on the RAM 203 and executing the programs by the CPU 201 in the terminal apparatus 200. The above described program can be stored in a computer readable storage medium such as compact disk (CD), CD-ROM, CD-R, flexible disk (FD), and digital versatile disk (DVD) with an installable format and executable format file, but not limited thereto. For example, the program can be stored on a server or a storage on a network such as the Internet, and downloaded via the network as required. Further, the program can be distributed via the network such as the Internet.

A description is given of the MFP 100. As illustrated in FIG. 4, the MFP 100 includes, for example, the operation panel 131, and the control unit 110. The control unit 110 includes, for example, a panel controller 141, a print controller 122, a communication controller 143 (second connection unit), a setting storage 144, a timer 145, and a data communication unit 146. The panel controller 141 is used to communicate data between the control unit 110 and the operation panel 131, which can be implemented by the panel I/F 121. The communication controller 143 and the data communication unit 146 are used to communicate data with the terminal apparatus 200, which can be implemented by the network I/F 112. The setting storage 144, which can be implemented by the RAM 118 (FIG. 2), stores communication settings. The timer 145 used as a time counter, which can be implemented by the CPU 116 and the RAM 118 (FIG. 2), starts a time counting after completing the printing operation.

(Transition of Screen Image)

FIGS. 5A to 5F illustrate examples of transition of screen images of the terminal apparatus 200 when the terminal apparatus 200 is to be directly connected to the MFP 100. FIGS. 5A to 5F illustrate the transition of screen images when the print application calls a network setting screen of OS, and then returns to the print application screen again. When the OS installed in the terminal apparatus 200 is a specific OS (e.g., iOS) that does not allow an application to change a connection partner such as a network, the application calls a network setting screen managed by OS to display the network setting screen managed by the OS by using the UI unit 231 so that the switching of the connection partner or the network can be performed easily.

Figure 5A:
FIGS. 5A, 5B, 5C, 5D, 5E, and 5F illustrate examples of transition of screen images of a terminal apparatus when the terminal apparatus is to be directly connected to an information processing apparatus.

FIG. 5A illustrates an example of a setting screen of the print application. When a user transmits a print job to a desired apparatus such as the MFP 100 by using the activated print application, but the MFP 100 to be used as a transmission destination of the print job is not present on the network N where the terminal apparatus 200 is connected, the user is required to connect the terminal apparatus 200 and the MFP 100 communicably. In this case, the user displays a setting screen 410 of the print application (FIG. 5A). When the user selects a connection apparatus switching 411 in the setting screen 410 (FIG. 5A), the connection setting unit 232 of the application control unit 230 calls the network switching unit 242 of the OS unit 240. Then, the network switching unit 242 displays a Wi-Fi setting screen 420 illustrated in FIG. 5B by using the UI unit 231.

Figure 5B:
Figure 5C:
Figure 5D:
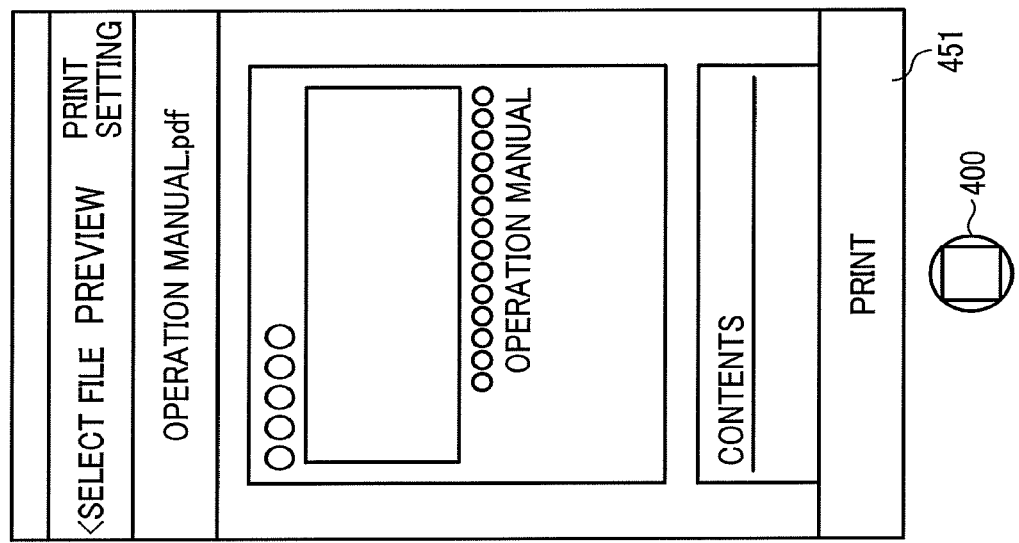

FIGS. 5B to 5D illustrate examples of screens related to Wi-Fi setting that OS provides. FIGS. 5B to 5D illustrate examples that SSID (Service Set IDentifier) and PIN code (Personal Identification Number code) are used for the connection, but not limited thereto. For example, the terminal apparatus 200 can be directly connected to the MFP 100 by using WPS (Wi-Fi Protected Setup).

The user checks whether Wi-Fi is set "ON" in the Wi-Fi setting screen 420 (FIG. 5B). When Wi-Fi is "OFF," the user sets Wi-Fi to "ON." When Wi-Fi is set "ON," the network switching unit 242 searches a connectable network (e.g., access point) in the Wi-Fi setting screen 420, and displays a SSID of the connectable network (e.g., access point) on the Wi-Fi setting screen 420.

When the MFP 100 is set with the direct connection mode, the SSID of the MFP 100 is displayed on the Wi-Fi setting screen 420 (e.g., MFP-Direct in FIG. 5B). When the user selects the MFP 100 as a connection partner, a password input screen 430 illustrated in FIG. 5C is displayed, wherein the password may be PIN code or encrypted key. When the user inputs the password and then presses or taps a "connection" button, the screen transits to the Wi-Fi setting screen 420 illustrated in FIG. 5D. When the terminal apparatus 200 is directly connected to the MFP 100, a check mark indicating the direct connection is displayed at the left side the connected apparatus name "MFP-Direct" (FIG. 5D)

Figure 5E:
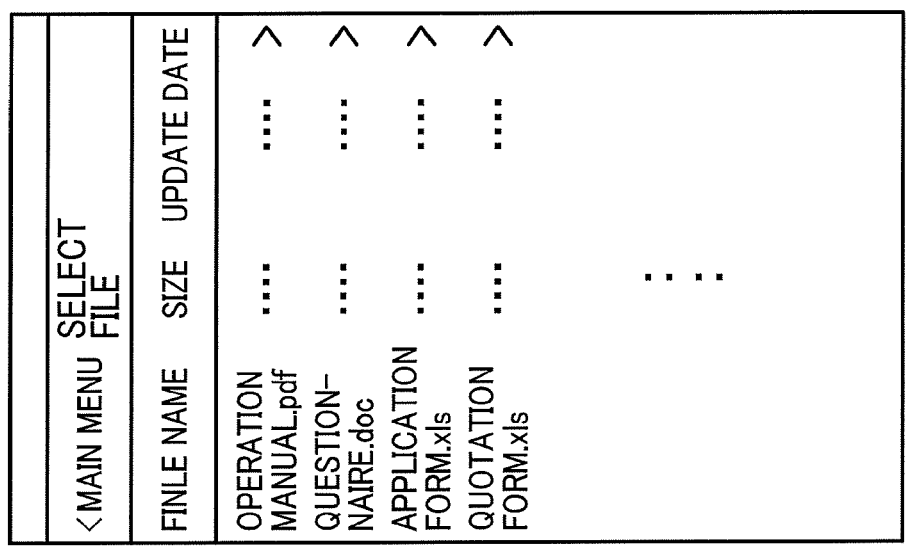
Figure 5F:
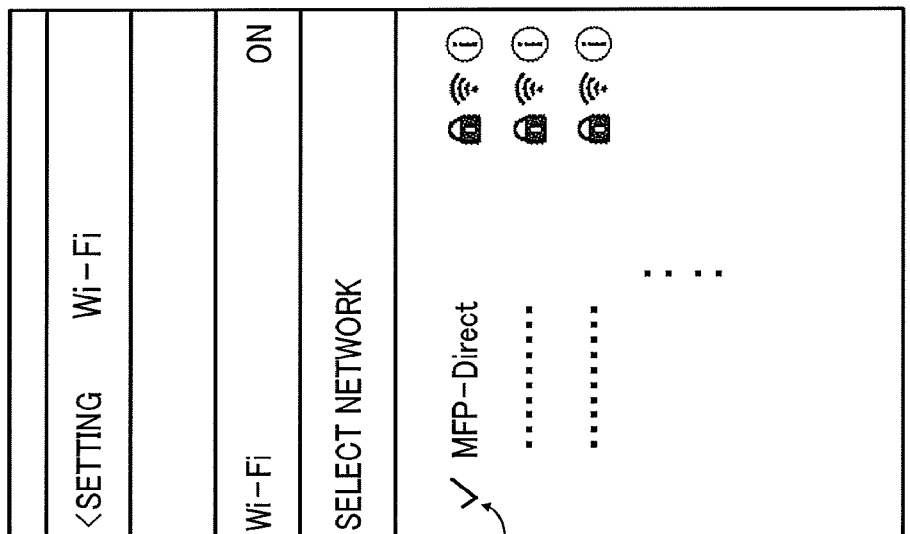

FIG. 5E illustrates an example of a print data selection screen 440 that is provided by the print application. FIG. 5F illustrates an example of a preview screen 450 that is provided by the print application. When returning from the Wi-Fi setting screen 420 of OS to the screen of the print application, the user taps a home button 400 of the terminal apparatus 200 to return to a home screen, and then calls the print application from the home screen. When the user selects to-be-printed data (e.g., operation manual.pdf) from the print data selection screen 440 (FIG. 5E), a preview screen 450 illustrated in FIG. 5F is displayed. When the user taps a print button 451 on the preview screen 450 (FIG. 5F), the print job of the selected data is transmitted to the MFP 100.

First Embodiment

Figure 6:
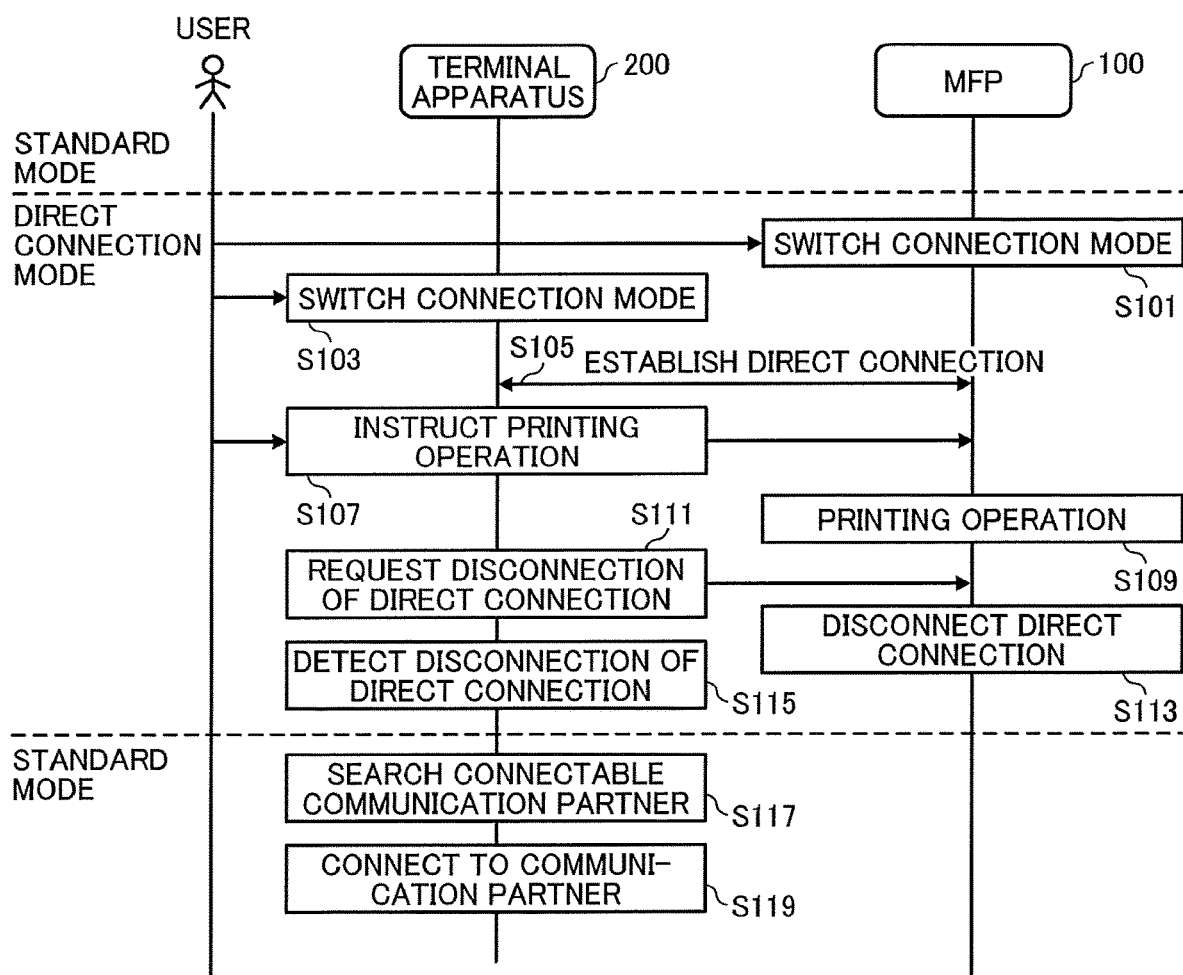
FIG. 6 is an example of a sequential chart illustrating an operation of a direct connection processing and a disconnection processing between a terminal apparatus and an information processing apparatus.

FIG. 6 is an example of a sequential chart illustrating an operation of a direct connection processing and a disconnection processing between the terminal apparatus 200 and the MFP 100. In this example case of FIG. 6, it is assumed that the MFP 100 is under a standard mode (i.e., first mode)

such as the MFP 100 is in a stand-alone environment not connected to the network N, or the MFP 100 is connected to the network N (FIG. 1), and then the MFP 100 is shifted to a direct connection mode (i.e., second mode) that the MFP 100 is directly connected with the terminal apparatus 200 (i.e., shift to direct connection mode), and then the MFP 100 is returned to the standard mode. In this example case of FIG. 6, it is assumed that the terminal apparatus 200 is under the standard mode such as the terminal apparatus 200 is connected to the network N (FIG. 1), and then the terminal apparatus 200 is shifted to the direct connection mode that the terminal apparatus 200 is directly connected with the MFP 100, and then the terminal apparatus 200 is returned to the standard mode that the terminal apparatus 200 is connected to the network N again. In this example case of FIG. 6, it is assumed that a print application is activated in the terminal apparatus 200.

At step S101, a user operates the operation panel 131 of the MFP 100, or presses a direct connection switching button disposed separately from the operation panel 131 to instruct the MFP 100 to switch a network connection mode of the MFP 100 to the direct connection mode. The communication controller 143 of the MFP 100 shifts a connection mode of the MFP 100 to the direct connection mode based on an instruction from the user. The communication controller 143 waits for some time so that the terminal apparatus 200 is connected with the MFP 100 used as access point of Wi-Fi Direct.

At step S103, the user instructs the terminal apparatus 200 to execute the direct connection with the MFP 100 by using the UI unit 231 (FIG. 5). Specifically, the user calls the Wi-Fi setting screen 420 of OS (FIG. 5B) from the setting screen of the print application (FIG. 5A), and selects the MFP 100 (i.e., MFP-Direct) as a connection partner, and inputs required setting such as a password (FIG. 5C).

At step S105, the network switching unit 242 of the terminal apparatus 200 and the communication controller 143 of the WP 100 perform a connection process (i.e., negotiation) using Wi-Fi direct to establish the direct connection for the terminal apparatus 200 and the MFP 100 (FIG. 5D). When the negotiation is performed and completed, the MFP 100 is used as an access point, and the terminal apparatus 200 is used as a client.

At step S107, the user selects a target print file from the UI unit 231 of the terminal apparatus 200, and instructs a printing operation (FIGS. 5E and 5F). Based on an instruction received from the user, the print manager 234 of the terminal apparatus 200 reads the target print data from the data storage 241, and transfers the target print data to the print data converter 235. The print data converter 235 converts the target print data to printable format data such as page-description language (PDL), and transmits the printable format data to the MFP 100 via the data communication unit 243 as a print job.

At step S109, the print controller 122 of the MFP 100 controls the printer engine 132 (FIG. 2) to perform or execute the printing operation of the print job that is received from the terminal apparatus 200 via the data communication unit 146.

At step S111, the terminal apparatus 200 transmits a disconnection request of the direct connection to the MFP 100. Specifically, after the print job is transmitted to the MFP 100, the print manager 234 of the terminal apparatus 200 instructs or commands the disconnection requesting unit 236 to transmit the disconnection request of the direct connection. After receiving the disconnection request instruction, the disconnection requesting unit 236 transmits the disconnection request of the direct connection to the MFP 100.

At step S113, after receiving the disconnection request of the direct connection from the terminal apparatus 200, the communication controller 143 of the MFP 100 disconnects the direct connection, with which the MFP 100 returns to the standard mode.

At step S115, the network switching unit 242 of the terminal apparatus 200 detects that the direct connection is disconnected. Specifically, since the network switching unit 242 continuously monitors a connection status of the network, the network switching unit 242 can detect the disconnection of the direct connection when the direct connection is disconnected.

At step S117, the network switching unit 242 of the terminal apparatus 200 searches a network (i.e., access point) that can be connected with the terminal apparatus 200.

At step S119, the network switching unit 242 of the terminal apparatus 200 performs a connection process with a network having the highest priority level among the searched networks. The priority level of networks can be determined based on connection history information. With this configuration, the terminal apparatus 200 can be shifted to the standard mode, which means that the terminal apparatus 200 is connected to the network N again.

As to the above described first embodiment, when an application of the terminal apparatus 200 requests the information processing apparatus such as the MFP 100 to disconnect the direct connection, and the MFP 100 receives the disconnection request from the terminal apparatus 200, the MFP 100 disconnects the direct connection. When the OS of the terminal apparatus 200 detects the disconnection of the direct connection, the OS of the terminal apparatus 200 searches a network connectable with the terminal apparatus 200, and returns the terminal apparatus 200 to the standard mode that the terminal apparatus 200 is connected to a network. Therefore, even if the OS of the terminal apparatus 200 is designed not to allow the application to change the network connection, the direct connection can be disconnected, and then the terminal apparatus 200 can be reconnected to a suitable network.

Second Embodiment

A description is given of a second embodiment of the present invention. As to the first embodiment, the terminal apparatus 200 transmits the disconnection request at step S111 to the MFP 100 after completing the transmission of the print job. However, when a printing error (e.g., sheet jamming) occurs at the MFP 100 during a printing operation (i.e., target operation), the terminal apparatus 200 that has transmitted the disconnection request cannot detect a status of the MFP 100 such as the printing error occurring at the MFP 100. If the user directly checks the status of MFP 100 to recognize the printing error and stop of printing of the print job at the MFP 100, the user is required to operate again to connect the terminal apparatus 200 and the MFP 100 by the direct connection, and then reprinting of the print data, which was not printed (i.e., printing error), is printed, in which a user's operation becomes complex.

Figure 7:
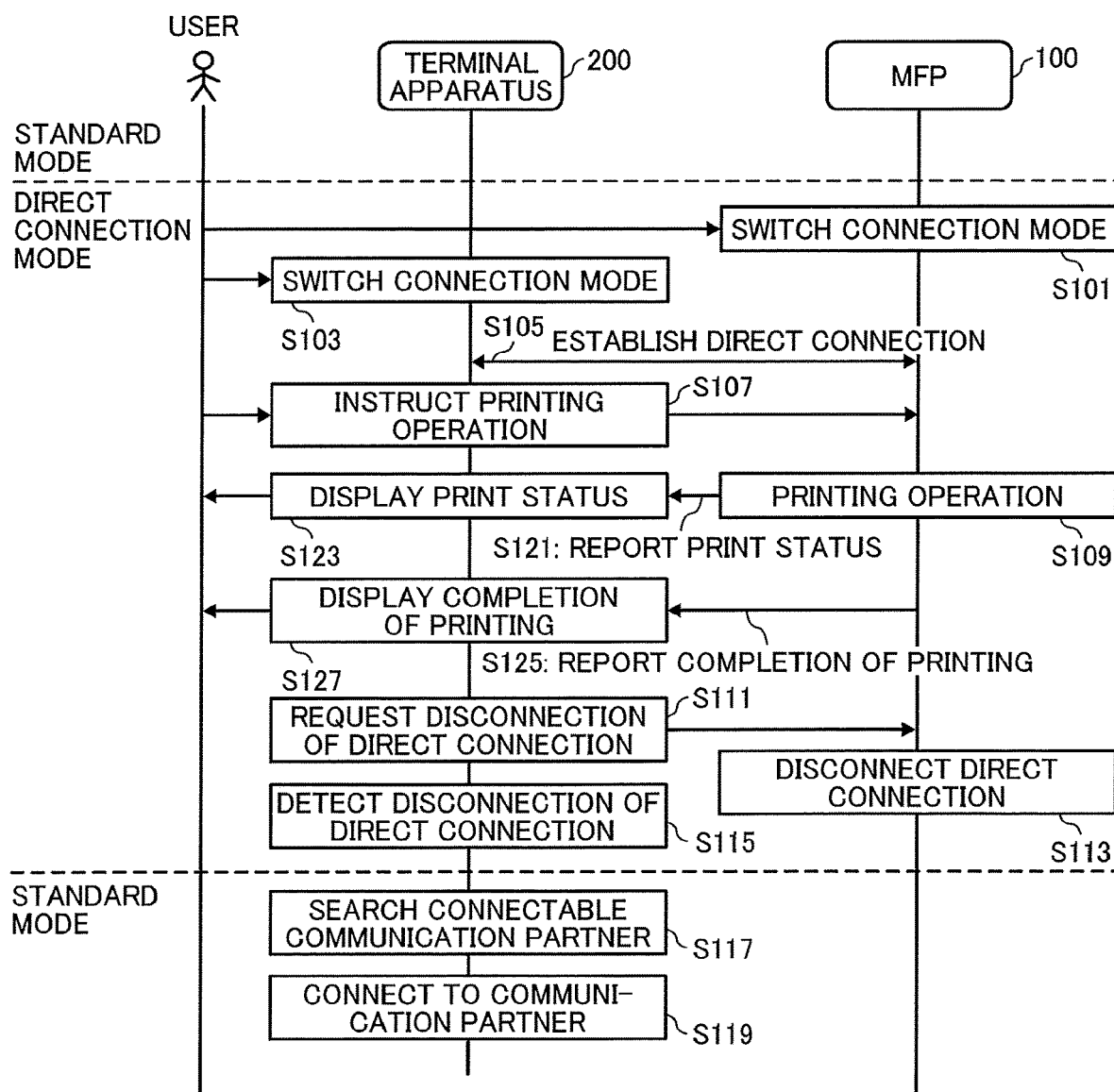
FIG. 7 is an example of a sequential chart illustrating a normal operation of a terminal apparatus and an information processing apparatus of a second embodiment of the present invention.

FIG. 7 is an example of a sequential chart illustrating a normal operation of the terminal apparatus 200 and the MFP 100 of a second embodiment of the present invention. As to the second embodiment, the terminal apparatus 200 is configured to monitor the status of the MFP 100. As to the second embodiment, the operations similar to or same as the first embodiment are assigned with the same step numbers, and the description of similar or same step numbers are omitted.

When the MFP 100 is printing the print job at step S109, the print manager 234 of the terminal apparatus 200 acquires a print status from the MFP 100 periodically or at required timing (step S121). The acquired print status includes, for example, the status of the MFP 100 (e.g., now printing, waiting for completion of printing, error occurrence, error information), and a performance rate (e.g., processing rate) of the print job. The print status of the MFP 100 can be acquired by using the print controller 122 of the MFP 100 or the print manager 234 of the terminal apparatus 200. Specifically, the print controller 122 of the MFP 100 can be configured to transmit the print status to the terminal apparatus 200, or the print manager 234 of the terminal apparatus 200 can be configured to transmit a polling (i.e., inquiry) to the print controller 122 of the MFP 100 to acquire the print status from the MFP 100.

At step S123, the print manager 234 displays the acquired print status by using the UI unit 231. FIG. 11 illustrates an example of a print status screen 460 displayable at step S123. The print status screen 460 displays, for example, a file name being printed, a message indicating a printing operation is being performed, and a page number being printed, in which the page number being printed changes depending on a printing status. The print status screen 460 can also display a total number of pages to be printed in addition to the page number being printed.

When the print job processing is completed, at step S125, the print controller 122 of the MFP 100 reports the print status indicating the completion of printing as a notice of completion of target operation to the terminal apparatus 200. When the terminal apparatus 200 acquires the notice of completion of target operation, the print manager 234 of the terminal apparatus 200 instructs the UI unit 231 to display the completion of printing at step S127. After the notice of the completion of printing is acquired, the disconnection requesting unit 236 of the terminal apparatus 200 transmits the disconnection request of the direct connection to the MFP 100 (step S111).

Figure 8:
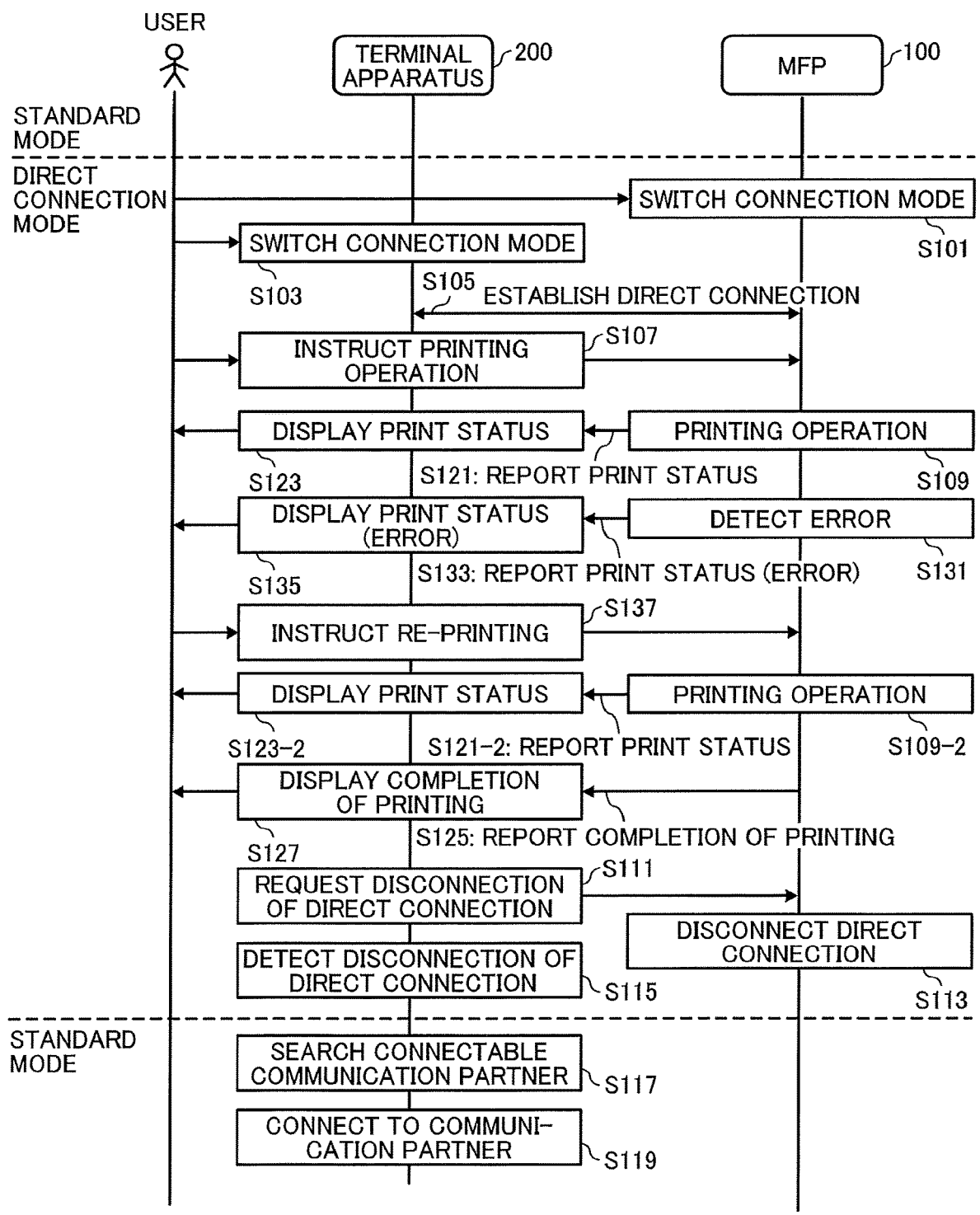
FIG. 8 is an example of a sequential chart illustrating an operation of a terminal apparatus and an information processing apparatus when an error occurs at the information processing apparatus of second embodiment of the present invention.

FIG. 8 is an example of a sequential chart illustrating an operation of the terminal apparatus 200 and an operation of the MFP 100 when an error occurs at the MFP 100 of the second embodiment of the present invention. The descriptions of operations similar to or same as the normal operation (FIG. 7) are omitted.

At step S131, when the print controller 122 of the MFP 100 detects an error occurrence during a printing operation, the print controller 122 reports the print status of the error occurrence to the terminal apparatus 200 (step S133).

At step S135, the print manager 234 of the terminal apparatus 200 instructs the UI unit 231 to display the print status. FIG. 12 illustrates an example of a print status screen 470 displayable at step S135. The print status screen 470 displays, for example, a file name being printed, a message indicating an error occurrence, a reprint button 471 used for instructing a reprinting operation, and a print stop button 472 used for instructing a stop or cancel of the printing operation. When the print status screen 470 is displayed at step S135, a user can visually check the print status displayed on the screen of the terminal apparatus 200, and can determine whether a reprinting operation is to be performed. The print status can be reported to the user visually, and/or an audio sound outputtable from the audio output unit 210 (FIG. 3) as an audible report.

At step S137, the user instructs the reprinting operation from the UI unit 231 of the terminal apparatus 200. Specifically, the user presses the reprint button 471 (FIG. 12). Based on an instruction received from the user, the print manager 234 transmits the print job to the print data converter 235 again. Then, steps S109-2, S121-2, and S123-2 are performed similar to steps S109, S121, and S123. When the print job processing is completed, step S125 and the subsequent steps are performed. When an error occurs again at the MFP 100, steps S131 to S135 are repeated. Further, at step S137, the user can input a print stop instruction instead of the reprinting operation instruction. Specifically the user can press the print stop button 472 (FIG. 12), in which step S111 and the subsequent steps are performed.

As to the above described second embodiment, when the terminal apparatus 200 acquires the print status from the MFP 100, and then the terminal apparatus 200 acquires the notice of completion of target operation from the MFP 100, the terminal apparatus 200 transmits the disconnection request to the MFP 100. Therefore, the user can check the operation status of the MFP 100 until the MFP 100 completes the printing operation. Further, even if the printing error occurs at the MFP 100, the user can transmit a specific instruction such as the reprinting operation instruction and print stop instruction to the MFP 100 without performing the reconnection operation for Wi-Fi Direct.

Third Embodiment

A description is given of a third embodiment of the present invention. As to the first embodiment and the second embodiment, the terminal apparatus 200 transmits the disconnection request to the MFP 100 (step S111), and then the MFP 100 disconnects the direct connection based on the disconnection request, and returns the terminal apparatus 200 to the standard mode (step S113), in which the disconnection request is transmitted from the print application of the terminal apparatus 200.

However, when a user inputs an instruction of reconnection to another network from the network setting screen managed by the OS, the terminal apparatus 200 leaves from the direct connection while the disconnection request of the direct connection is not reported to the MFP 100. Further, when the communication environment deteriorates, and then the MFP 100 cannot receive the disconnection request transmitted from the terminal apparatus 200, the terminal apparatus 200 leaves from the direct connection while the MFP 100 cannot receive the disconnection request.

When the MFP 100 cannot receive the disconnection request from the terminal apparatus 200 due to some reasons, but the terminal apparatus 200 leaves from the direct connection, and the direct connection of the terminal apparatus 200 and the MFP 100 is ended, the MFP 100 cannot shift to the standard mode from the direct connection mode. If the MFP 100 is connected to the network N in the standard mode (FIG. 1), the MFP 100 is disconnected from the network N for some time to shift to the Wi-Fi Direct connection. Therefore, if the MFP 100 cannot be connected to the network N for a long period of time, another terminal apparatus 300 cannot use the MFP 100 via the network N.

Figure 9:
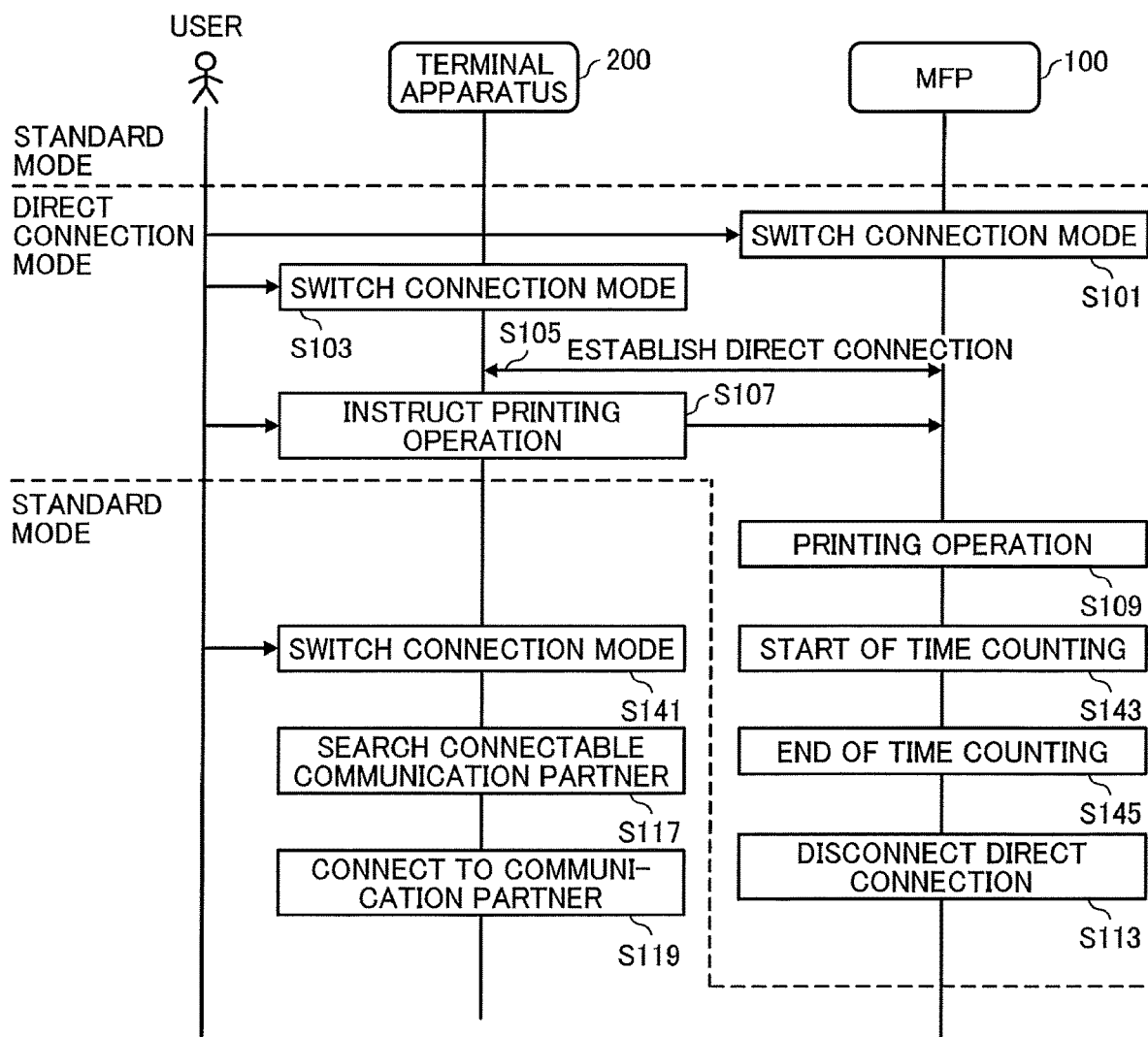
FIG. 9 is an example of a sequential chart illustrating a normal operation of a terminal apparatus and an information processing apparatus of a third embodiment.

FIG. 9 is an example of a sequential chart illustrating a normal operation of the terminal apparatus 200 and the MFP 100 of the third embodiment. As to the third embodiment, even if the MFP 100 does not receive the disconnection request of the direct connection from the terminal apparatus 200, the MFP 100 can cancel the direct connection mode, and return to the standard mode. As to the third embodiment, the operations similar to or same as the first embodiment are assigned with the same step numbers, and the description of similar or same step numbers are omitted.

When the MFP 100 completes the printing operation at step S109, the timer 145 starts a time counting (step S143). When a given time elapses (step S145) after the timer 145 starts the time counting (step S143), the communication controller 143 disconnects the direct connection at step S113. With this processing, the MFP 100 returns to the standard mode.

Further, when the MFP 100 receives the disconnection request from the terminal apparatus 200 between the start of time counting by the timer 145 (step S143) and the end of time counting by the timer 145 (step S145), the communication controller 143 disconnects the direct connection based on the disconnection request at step S113, and then the timer 145 ends the time counting. Further, when the terminal apparatus 200 transmits a new print job to the MFP 100 between the start of time counting by the timer 145 (step S143) and the end of time counting by the timer 145 (step S145), the timer 145 stops the time counting, and the print controller 122 performs or executes a new print job processing. Further, when the printing operation is completed, the timer 145 is reset to restart the time counting.

As to the third embodiment, even if the terminal apparatus 200 ends the direct connection mode without transmitting the disconnection request of the direct connection to the MFP 100 (step S141), and then performs a reconnection of the terminal apparatus 200 to the network N (steps S117 an S119), the MFP 100 can shift from the direct connection mode to the standard mode. As to the third embodiment, since the timer 145 starts the time counting when the printing is completed, the terminal apparatus 200 can receive the print status of the second embodiment. Further, the timer 145 can be configured to start the time counting right after receiving the print job, and the direct connection can be disconnected before completing the printing operation similar to the first embodiment.

Fourth Embodiment

A description is given of a fourth embodiment of the present invention. At to the third embodiment, the MFP 100 disconnects the direct connection when the printing is completed and then a given time elapses. However, when the timer 145 ends the time counting before a user transmits a new print job, the direct connection is disconnected before transmitting the print job, which is not convenient for a user. Therefore, as to the fourth embodiment, based on user needs, the terminal apparatus 200 is configured to set various settings for the disconnection processing of the direct connection performed by the MFP 100.

As to the fourth embodiment, a user can set a disconnection condition of the direct connection performed by the MFP 100. Specifically, the user can set whether the disconnection request from the terminal apparatus 200 is required for the MFP 100 as a first disconnection condition and a second disconnection condition to the MFP 100 so that the MFP 100 performs the disconnection processing of the direct connection based on the first disconnection condition or the second disconnection condition, and transmission timing of the disconnection request from the terminal apparatus 200 to the MFP 100. The user can input the disconnection condition of the direct connection (i.e., first disconnection condition, second disconnection condition) from the UI unit 231. The input disconnection condition is managed by the print manager 234.

When the disconnection request from the terminal apparatus 200 is "not required" (i.e., first disconnection condition) for performing the disconnection processing of the direct connection, the MFP 100 disconnects the direct connection even if the MFP 100 does not receive the disconnection request from the terminal apparatus 200. For example, the MFP 100 can disconnect the direct connection right after the print job processing is completed, or when a given time elapses after the print job processing is completed.

By contrast, when the disconnection request from the terminal apparatus 200 is "required" (i.e., second disconnection condition) for performing the disconnection processing of the direct connection, the MFP 100 disconnects the direct connection based on the disconnection request received from the terminal apparatus 200. In this case, the user can set a transmission timing of the disconnection request from the terminal apparatus 200. For example, when the transmission timing of the disconnection request is set for "each job," the print manager 234 controls the disconnection requesting unit 236 to transmit the disconnection request to the MFP 100 when the terminal apparatus 200 transmits one print job to the MFP 100, or when the MFP 100 completes one print job processing (e.g., when the terminal apparatus 200 acquires the notice of completion of target operation). When the transmission timing of the disconnection request is set for "all jobs is completed (e.g., print application is ended)," the print manager 234 controls the disconnection requesting unit 236 to transmit the disconnection request to the MFP 100 when the user inputs am instruction of end of the application to the print manager 234. Then, the application is ended.

The above described disconnection conditions can be reported to the MFP 100 when the print manager 234 stores the above described disconnection conditions or when the disconnection condition is included in the print job as one of setting information and then the print job is transmitted to the MFP 100. The print manager 234 stores the above described disconnection conditions in a specific area allocated in the EEPROM 204 (FIG. 3).

Figure 10:
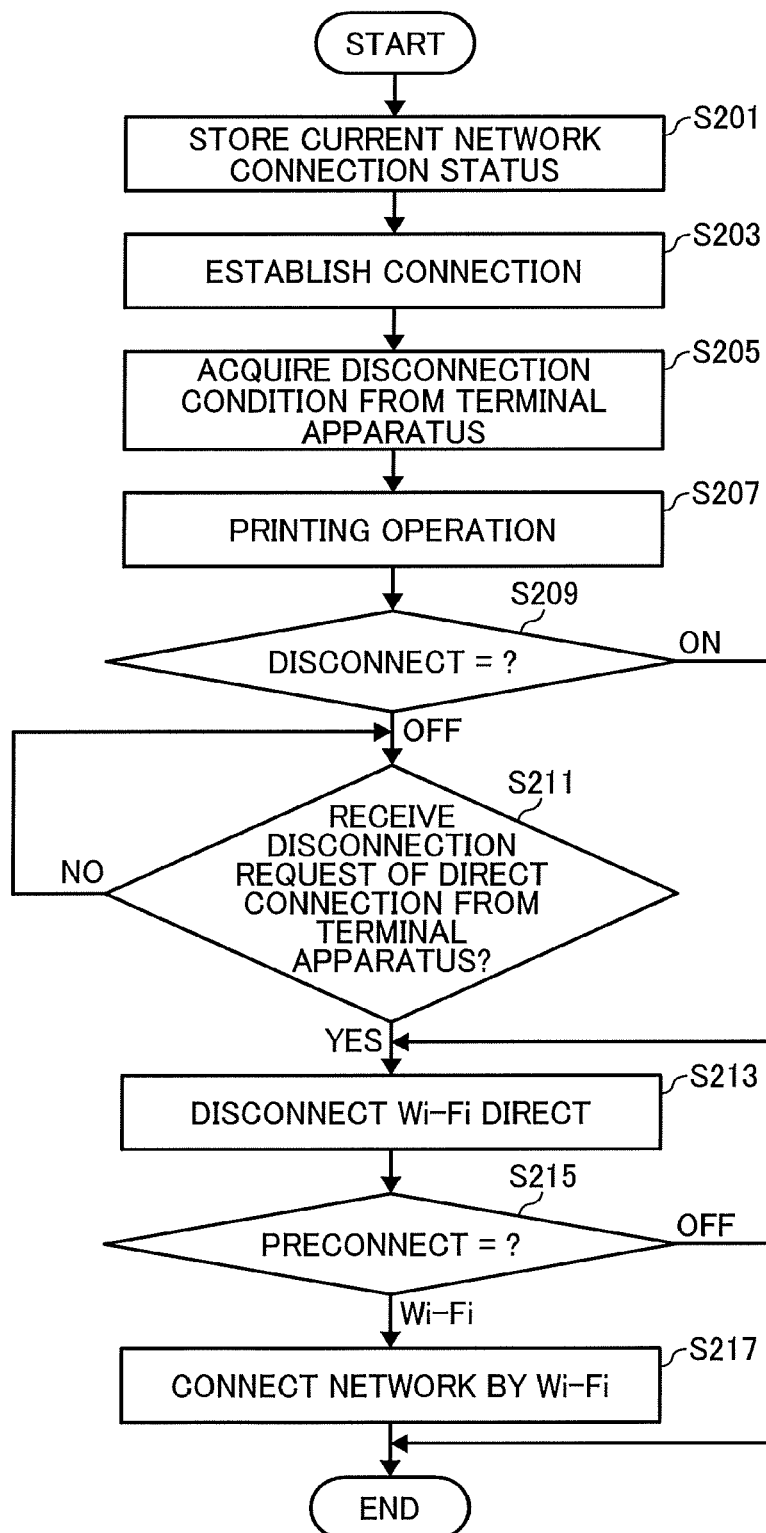
FIG. 10 is an example of a flow chart illustrating steps of an operation of an information processing apparatus of a fourth embodiment.

FIG. 10 is an example of a flow chart illustrating steps of an operation of the MFP 100 of the fourth embodiment. At step S201, the communication controller 143 stores a current network connection status in the setting storage 144 before shifting the MFP 100 to the direct connection mode. At step S201, "pre-connect=OFF" means that the MFP 100 is a stand-alone apparatus, which means the MFP 100 is not connected to the network. Further, "pre-connect=Wi-Fi" means that the MFP 100 is connected to the network N by using the Wi-Fi connection (FIG. 1).

At step S203, the communication controller 143 performs a connection process (i.e., negotiation) for Wi-Fi Direct with the terminal apparatus 200, and establish a connection of the MFP 100 and the terminal apparatus 200. The process at step S203 is same as the process at step S105 of FIG. 6.

At step S205, the communication controller 143 acquires a disconnection condition from the terminal apparatus 200, and stores the disconnection condition of the direct connection in the setting storage 144. At step S205, "Disconnect=OFF" means that the direct connection is to be disconnected after receiving the disconnection request from the terminal apparatus 200 while "Disconnect=ON" means that the direct connection is to be disconnected without receiving the disconnection request from the terminal apparatus 200.

At step S207, the print controller 122 performs or executes a printing operation of the print job received from the terminal apparatus 200. The process at step S207 is same as the process at step S109 of FIG. 6.

At step S209, the communication controller 143 reads and checks the disconnection condition of the direct connection from the setting storage 144. When "Disconnect=OFF" is at step S209, the process of step S211 is performed, and when "Disconnect=ON" is at step S209, the process of step S213 is performed.

At step S211, the communication controller 143 monitors or checks whether the disconnection request of the direct connection is received from the terminal apparatus 200. When the MFP 100 receives the disconnection request of the direct connection (step S211: YES), the process of step S213 is performed.

At step S213, the communication controller 143 disconnects the direct connection.

At step S215, the communication controller 143 reads and checks a connection status of the MFP 100 before the MFP 100 shifted to the direct connection mode from the setting storage 144. When "pre-connect=OFF" is set, the sequence is ended, and when "pre-connect=Wi-Fi" is set, the process of step S217 is performed.

At step S217, the communication controller 143 performs or executes processing to return the MFP 100 to a previous communication environment. Specifically, the MFP 100 is returned and connected to the network N by Wi-Fi (see FIG. 1).

As to the fourth embodiment, various settings related to the disconnection processing of the direct connection performed by the MFP 100 can be set from the terminal apparatus 200. With this configuration, operations matched to the user needs can be executed by the MFP 100, with which conveniences of users can be further enhanced.

The above described embodiments have following configurations.

(First Configuration)

As to the first configuration, the communication system 1 includes the information processing apparatus (MFP 100), and the terminal apparatus (terminal apparatus 200). The terminal apparatus includes first circuitry to perform a direct connection with the information processing apparatus wirelessly, transmit an information processing request, requesting processing of information, to the information processing apparatus, and transmit a disconnection request of the direct connection to the information processing apparatus after transmitting the information processing request to the information processing apparatus. The information processing apparatus includes second circuitry to perform the direct connection with the first circuitry of the terminal apparatus wirelessly, process the information processing request received from the terminal apparatus, and disconnect the direct connection of the information processing apparatus and the terminal apparatus in response to receiving the disconnection request.

The wireless direct connection means, for example, a direct connection of one apparatus and another apparatus without intervening a router or the like, and the direct connection is known as the pier to pier communication using, for example, Wi-Fi Direct, or other connection methods. As to the first embodiment, an application of the terminal apparatus 200 requests the information processing apparatus such as the MFP 100 to disconnect the direct connection, and when the MFP 100 that receives the disconnection request, the MFP 100 disconnects the direct connection. When the OS of the terminal apparatus 200 detects the disconnection of the direct connection, the OS of the terminal apparatus 200 searches a network connectable with the terminal apparatus 200, and returns the terminal apparatus 200 to the standard mode such as a network that that the terminal apparatus 200 is connected under the standard mode. Therefore, when the terminal apparatus 200 is connected with the MFP 100 directly, and the OS of the terminal apparatus 200 is designed not to allow the application of the terminal apparatus 200 to switch or change the connection partner (i.e., connection switching is exclusively controlled by OS), the terminal apparatus 200 can be disconnected from the direct connection after transmitting the target information to the MFP 100, and then the terminal apparatus 200 can be reconnected to a suitable network.

(Second Configuration)

As to the second configuration of the communication system 1, when the first circuitry of the terminal apparatus acquires a notice of completion of a target operation, corresponding to the information processing request, from the information processing apparatus (MFP 100), the first circuitry of the terminal apparatus transmits the disconnection request to the information processing apparatus (MFP 100). As to the second configuration, even if the printing error occurs at the information processing apparatus (MFP 100) during the processing of information (e.g., print job), the user can transmit an instruction of re-processing of the information (e.g., print job) to the information processing apparatus (MFP 100) without performing the reconnection operation for the direct connection.

(Third Configuration)

As to the third embodiment of the communication system 1, the information processing apparatus (MFP 100) includes the second circuitry of the information processing apparatus including the time counter (timer 145) that starts a time counting after completing the target operation corresponding to the information processing request, and the second circuitry of the information processing apparatus disconnects the direct connection of the information processing apparatus and the terminal apparatus when the time counter counts a given time period. For example, a case that the information processing apparatus (MFP 100) and another terminal apparatus 300 are connected to the network N, and another terminal apparatus 300 can use the capabilities of the information processing apparatus via the network N is assumed. In this configuration, when the MFP 100 leaves from the network N for the direct connection, and then the MFP 100 does not return to the network N, another terminal apparatus 300 cannot use the information processing apparatus for a long period of time, which is not convenient for users. As to the third embodiment, even when the information processing apparatus cannot receive the disconnection request from the terminal apparatus (terminal apparatus 200) due to some reasons, the information processing apparatus can be returned to a previous network environment (e.g., stand-alone environment, or connected to the network N) from the direct connection mode.

(Fourth Configuration)

As to the fourth configuration of the communication system 1, the first circuitry of the terminal apparatus (terminal apparatus 200) sets any one of a first disconnection condition not requiring a transmission of the disconnection request to the information processing apparatus (MFP 100) when the second circuitry of the information processing apparatus disconnects the direct connection of the information processing apparatus and the terminal apparatus, and a second disconnection condition requiring the transmission of the disconnection request to the information processing apparatus when the second circuitry of the information processing apparatus disconnects the direct connection of the information processing apparatus and the terminal apparatus, to the information processing apparatus. The second circuitry of the information processing apparatus disconnects the direct connection of the information processing apparatus and the terminal apparatus after completing the target operation, corresponding to the information processing request, without receiving the disconnection request from the terminal apparatus when the first disconnection condition is set to the information processing apparatus. The second circuitry of the information processing apparatus disconnects the direct connection of the information processing apparatus and the terminal apparatus after completing the target operation, corresponding to the information processing request, and then receiving the disconnection request from the terminal apparatus when the second disconnection condition is set to the information processing apparatus. As to the fourth embodiment, various settings related to the disconnection processing of the direct connection performed by the information processing apparatus (MFP 100) can be set from the terminal apparatus (terminal apparatus 200). With this configuration, operations matched to the user needs can be executed by the information processing apparatus (MFP 100), with which conveniences of users can be further enhanced.

As to the above described embodiments, when the terminal apparatus and the information processing apparatus are direct connected wirelessly, and the application of the terminal apparatus cannot switch a network connection partner (destination) after completing the transmission because the disconnection of the direct connection is the exclusively controlled by OS of the terminal apparatus, the terminal apparatus can leave the direct connection after completing the transmission, and return to a standard network.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the terminal apparatus, information processing apparatus, information processing system, and information processing method, a program to execute the information processing method by a computer, and a storage or carrier medium of the program are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. A communication system comprising:
a terminal apparatus; and
an information processing apparatus,
wherein the terminal apparatus includes first circuitry configured to:
establish, via an application program running on the terminal apparatus and having a user interface and in response to a first user input received through the user interface of the application program, a direct connection with the information processing apparatus wirelessly, the direct connection being established via a direct connection network where the information processing apparatus functions as an access point;
transmit, via the application program and in response to a second user input distinct from the first user input, an information processing request, requesting processing of information, to the information processing apparatus; and
transmit, via the application program, a disconnection request of the direct connection to the information processing apparatus after transmitting the information processing request to the information processing apparatus,
wherein an operating system of the terminal apparatus monitors the direct connection with the direct connection network and automatically searches for a connection to another wireless network upon detecting the disconnection from the direct connection network,
wherein the information processing apparatus includes second circuitry configured to:
perform the direct connection with the first circuitry of the terminal apparatus wirelessly;
process the information processing request received from the application program of the terminal apparatus; and
disconnect the direct connection of the information processing apparatus and the terminal apparatus in response to receiving the disconnection request from the application program,
wherein the second circuitry is further configured to:
send an error notice to the terminal apparatus when an error has occurred in a target operation corresponding to the information processing request; and
maintain the direct connection until receiving a response to the error notice from the terminal apparatus, and
wherein the target operation is a printing operation.

2. The communication system of claim 1, wherein when the first circuitry of the terminal apparatus acquires a notice of completion of a target operation, corresponding to the information processing request, from the information processing apparatus, the first circuitry of the terminal apparatus transmits the disconnection request to the information processing apparatus.

3. The communication system of claim 1, wherein the second circuitry of the information processing apparatus includes a time counter that starts a time counting after completing a target operation, and the second circuitry of the information processing apparatus performs the disconnection when the time counter counts a given time period.

4. The communication system of claim 1, wherein the first circuitry of the terminal apparatus sets any one of a first disconnection condition not requiring a transmission of the disconnection request to the information processing apparatus when the second circuitry of the information processing apparatus disconnects the direct connection of the information processing apparatus and the terminal apparatus, and a second disconnection condition requiring the transmission of the disconnection request to the information processing apparatus when the second circuitry of the information processing apparatus disconnects the direct connection of the information processing apparatus and the terminal apparatus, to the information processing apparatus, wherein the second circuitry of the information processing apparatus disconnects the direct connection of the information processing apparatus and the terminal apparatus after completing a target operation, corresponding to the information processing request, without receiving the disconnection request from the terminal apparatus when the first disconnection condition is set to the information processing apparatus, wherein the second circuitry of the information processing apparatus disconnects the direct connection of the information processing apparatus and the terminal apparatus after completing the target operation, corresponding to the information processing request, and then receiving the disconnection request from the terminal apparatus when the second disconnection condition is set to the information processing apparatus.

5. The communication system of claim 1, wherein the terminal apparatus further includes a memory configured to store a plurality of instructions which, when executed by the first circuitry, cause the first circuitry to:

directly connect the terminal apparatus and the information processing apparatus wirelessly;

transmit the information processing request to the information processing apparatus; and transmit the disconnection request of the direct connection to the information processing apparatus after transmitting the information processing request to the information processing apparatus.

6. The communication system of claim 5, wherein the plurality of instructions stored in the memory of the terminal apparatus further cause the first circuitry to:

transmit the disconnection request to the information processing apparatus when the first circuitry acquires a notice of completion of a target operation, corresponding to the information processing request, from the information processing apparatus.

7. The communication system of claim 5, wherein the second circuitry is configured to receive a selection of a first condition for disconnecting the direct connection when there is a disconnection request from the terminal apparatus as a disconnection condition, or a second condition for disconnecting the direct connection without receiving the disconnection request from the terminal apparatus, when the first condition is selected, the second circuitry disconnects the direct connection based on the disconnection request from the terminal apparatus, and when the second condition is selected, the second circuitry disconnects the direct connection without receiving the disconnection request from the terminal apparatus.

8. A terminal apparatus comprising:
    circuitry configured to
        establish, via an application program running on the terminal apparatus and having a user interface and in response to a first user input received through the user interface of the application program, a direct connection with an information processing apparatus wirelessly, the direct connection being established via a direct connection network where the information processing apparatus functions as an access point;

transmit, via the application program and in response to a second user input distinct from the first user input, an information processing request, requesting processing of information, to the information processing apparatus; and transmit, via the application program, a disconnection request of the direct connection to the information processing apparatus after transmitting the information processing request to the information processing apparatus, wherein an operating system of the terminal apparatus monitors the direct connection with the direct connection network and automatically searches for a connection to another wireless network upon detecting the disconnection from the direct connection network, wherein the information processing apparatus performs the direct connection with the first circuitry of the terminal apparatus wirelessly, processes the information processing request received from the terminal apparatus, and disconnects the direct connection of the information processing apparatus and the terminal apparatus in response to receiving the disconnection request from the application program, wherein the information processing apparatus send an error notice to the terminal apparatus when an error has occurred in a target operation corresponding to the information processing request, maintain the direct connection until receiving a response to the error notice from the terminal apparatus, and wherein the target operation is a printing operation.

9. A method of communication for a terminal apparatus and an information processing apparatus, the method comprising:

establishing, by first circuitry of the terminal apparatus and via an application program running on the terminal apparatus and having a user interface and in response to a first user input received through the user interface of the application program, a direct connection with the information processing apparatus wirelessly, the direct connection being established via a direct connection network where the information processing apparatus functions as an access point;

transmitting, by the first circuitry and via the application program and in response to a second user input distinct from the first user input, an information processing request, requesting processing of information, to the information processing apparatus; and transmitting, by the first circuitry and via the application program, a disconnection request of the direct connection to the information processing apparatus after transmitting the information processing request to the information processing apparatus, monitoring, by an operating system of the terminal apparatus, the direct connection with the direct connection network and automatically searching for a connection to another wireless network upon detecting the disconnection from the direct connection network, performing, by second circuitry of the information processing apparatus, the direct connection with the first circuitry of the terminal apparatus wirelessly;

processing, by the second circuitry, the information processing request received from the application program of the terminal apparatus; and disconnecting, by the second circuitry, the direct connection of the information processing apparatus and the terminal apparatus in response to receiving the disconnection request from the application program;

sending, by the second circuitry, an error notice to the terminal apparatus when an error has occurred in a target operation corresponding to the information processing request; and maintaining, by the second circuitry, the direct connection until receiving a response to the error notice from the terminal apparatus, and wherein the target operation is a printing operation.

10. The communication system of claim 1, wherein the another wireless network is an access point distinct from the information processing apparatus.

* * * * *